United States Patent [19]

Hölter et al.

[11] 4,123,502
[45] Oct. 31, 1978

[54] PROCESS FOR THE PURIFICATION OF GAS GENERATED IN THE PRESSURE GASIFICATION OF COAL

[75] Inventors: Heinz Hölter, Beisenstr. 39-41, Gladbeck, Fed. Rep. of Germany; Heinz Gresch, Dortmund-Derne; Heinrich Igelbuscher, Gladbeck, both of Fed. Rep. of Germany

[73] Assignee: Heinz Hölter, Fed. Rep. of Germany

[21] Appl. No.: 605,074

[22] Filed: Aug. 15, 1975

[30] Foreign Application Priority Data

| Feb. 6, 1975 | [DE] | Fed. Rep. of Germany | 2504839 |
| Feb. 28, 1975 | [DE] | Fed. Rep. of Germany | 2508666 |
| Mar. 6, 1975 | [DE] | Fed. Rep. of Germany | 2509667 |
| Mar. 6, 1975 | [DE] | Fed. Rep. of Germany | 2509733 |
| Mar. 6, 1975 | [DE] | Fed. Rep. of Germany | 2509789 |
| Mar. 7, 1975 | [DE] | Fed. Rep. of Germany | 250994 |

[51] Int. Cl.² .................... B01D 53/34; C10J 3/00
[52] U.S. Cl. .................... 423/230; 423/215.5; 423/231; 423/245; 55/84; 48/197 R; 48/210
[58] Field of Search ............ 423/230, 210, 220, 245, 423/226, 225, 232, 215.5, 231; 48/197 R, 200–203, 210, 206; 55/68, 69, 73, 84, 85, 89, 93, 94

[56] References Cited

U.S. PATENT DOCUMENTS

| 1,624,206 | 4/1927 | Bjerregaard | 423/245 |
| 1,895,724 | 1/1933 | Miller et al. | 423/231 |
| 1,944,903 | 1/1934 | Powell | 423/245 |
| 1,963,323 | 6/1934 | Bircher et al. | 423/245 |
| 2,010,003 | 8/1935 | Becker | 423/245 |
| 2,198,743 | 4/1940 | Schuftaw | 55/73 X |
| 2,560,403 | 7/1951 | Arveson | 48/202 |
| 3,022,148 | 2/1962 | James | 55/94 X |
| 3,117,844 | 1/1964 | Bureau | 423/231 X |
| 3,427,253 | 2/1969 | Becker-Boost et al. | 423/230 X |
| 3,929,429 | 12/1975 | Crouch | 48/202 |

FOREIGN PATENT DOCUMENTS

| 16,061 | 11/1934 | Australia | 423/243 |
| 336,316 | 10/1930 | United Kingdom | 423/226 |

OTHER PUBLICATIONS

Kirk–Othmer, "Encyclopedia of Chemical Technology," 2d Ed., 1969, vol. 19, p. 668.

*Primary Examiner*—Earl C. Thomas
*Attorney, Agent, or Firm*—Berman, Aisenberg & Platt

[57] ABSTRACT

A process for the purification of gas, which is generated in pressure gasification of coal, which uses a wash oil, especially tar oil, as the washing liquid to avoid clogging of the washing apparatus by tars and tar compounds which precipitate out of the washing liquid when water or aqueous solutions are employed as the washing liquid. The wash oil is preferably used in the circulation, from which solids and tars are continuously removed, and is then fed into the pressure reactor again. The wash oil circulation is continually regenerated through distillation, and the residues are fed into the pressure reactor. Heat is constantly extracted from the gas before or during the washing in a heat exchange process, making it possible to keep the heat loss extremely low and to create optimum temperature at every point of the total cycle by appropriate extraction or addition of heat. The heat extracted may be used for generation of steam, which is fed into the pressure reactor, into the distillation process for the regeneration and purification of the wash oil, and/or into the discharging flow of purified gas. The gas is also desirably brought into contact with separating materials, such as alkali, earth alkali, dolomite, etc., for the purpose of separating hydrogen sulfide.

40 Claims, 1 Drawing Figure

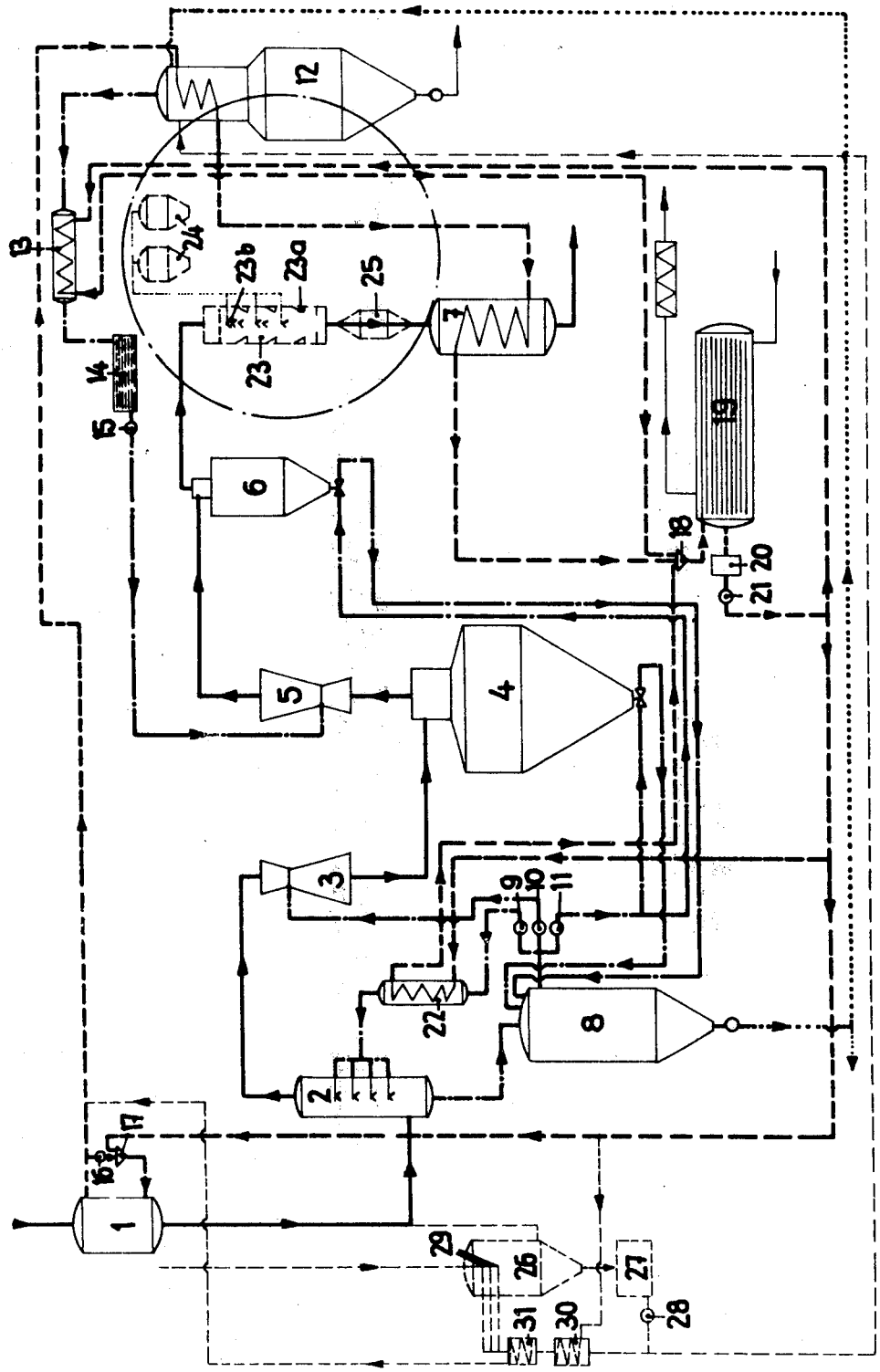

PROCESS FOR THE PURIFICATION OF GAS GENERATED IN THE PRESSURE GASIFICATION OF COAL

This invention concerns a process for the purification of gas which is generated in pressure gasification of coal. The gas (containing dust, heavy hydrocarbons, and hydrogen sulfide) is washed with a washing liquid.

In accordance with the current state of the art, water or aqueous solutions are generally employed as washing liquid. The disadvantage of using water or aqueous solutions as the washing liquid lies in the fact that cooling of the gas, which leaves the pressure reactor at from 550° to 1,000° C., occurs too severely because of the low boiling point of water. Because of the very rapid cooling, tars and their compounds, which do not dissolve in the washing water, are precipitated in the washing apparatus and, together with the separated dust and other insoluble materials, they soon clog and gum up the washing apparatus. Another disadvantage is that large quantities of heat (heat of evaporation), which cannot or can only with difficulty be subsequently recovered, are lost due to the evaporation of the washing water. In addition, the purified gas contains a relatively large amount of water vapor, which must then be removed from the gas. The water vapor also endangers the turbine which is usually used in the expansion of the gas, where the water and the aggressive chemicals dissolved in the water attack its blades. Finally, the washing water which accumulates cannot be discharged without costly treatment because of environmental perils.

It is therefore the objective of this invention to develop further the process of the initially-described type in such a manner that the danger of contamination and of the gradual clogging of the washing apparatus is reduced, the heat loss is kept as small as possible, and the water content which is contained in the raw gas is maintained in the purified gas.

The subject of the invention is a process for the purification of gas which is generated in pressure gasification of coal, containing dust, heavy hydrocarbons, and hydrogen sulfide, in which the gas is washed with washing liquid, whereby this process is characterized in that a wash oil, especially tar oil, is used as washing liquid. More particularly, the invention involves the improvement wherein the gas is not contacted with water, the washing liquid is a tar oil, 95 percent of which has a boiling temperature within the range of from 250° to 360° C., the gas is preliminarily cooled to a temperature within the last-noted range prior to contact with the tar oil and the gas is cooled during the washing only to a temperature which is within the boiling temperature range of the tar oil; this improvement is in a process for purifying gas (generated in pressure gasification of coal, under pressure, at a temperature within the range of from 550° to 1,000° C. and containing tar, other heavy hydrocarbons, dust and hydrogen sulfide) and which comprises washing the gas with a washing liquid.

With the use of oil (having a relatively high boiling point in comparison with water) as the washing liquid, the gas is cooled only into the range of the boiling temperature of this oil, so that the heat losses in the gas are clearly lower than with the use of water or aqueous solutions as washing liquid. At the relatively high boiling temperatures of the oil which is used, the heavy hydrocarbons which are separated from the gas also remain relatively fluid, so that they do not clog the washing apparatus but wash away from the washing apparatus, together with the wash oil, the dust, and other insoluble components. In spite of the relatively high temperature, the purification effect is not less than that obtained with the use of water and the necessarily associated lower temperatures, because of the affinity of the preferably employed tar oil to tar and to the other heavy hydrocarbons in the gas. Because the gas does not contact water, additional water vapor does not reach the gas so that the water content in the gas is not increased in the process in accordance with this invention.

The wash oil is preferably used in the circulation from which the solids and the tar are continuously removed, and it is then again fed into the pressure reactor. This results in a practically closed system in which the heavy hydrocarbons contained in the gas are again fed into the pressure reactor for the purpose of further cracking into gas. Consequently, there is an optimum gas yield with the lowest possible waste which might endanger the environment.

In order to prevent an overloading of the washing liquid circulation with heavy hydrocarbons and a gradual change in the composition of the washing liquid, it is furthermore provided that the wash oil circulation is continually regenerated through distillation, in its entirety or partially, and that the residues from the regeneration are fed into the pressure reactor.

In order to usefully extract excess heat from the gas before or during the washing process, it is furthermore provided that heat, which is again fed into the total process at a suitable point, via a heat carrier medium, is constantly extracted from the gas before or during the washing process, especially before the washing process, and/or from the wash oil, in a heat exchange process. This makes it possible to keep the heat loss extremely low and also to create the optimum temperature at every point of the total cycle by an appropriate extraction of heat or an appropriate addition of heat.

In spite of the use of wash oil, especially tar oil, as the washing liquid, the temperature decrease is relatively severe during the first contact with the wash oil or the cooling surfaces of the heat exchangers, so that the tar precipitates very early and, in combination with the dust which is still present in the gas, gums up the washing and cooling apparatus. It is therefore useful if the heat exchange process, which precedes the washing process, contains a prewashing stage in which the gas is washed and cooled with a wash tar which is fed through the circulation, from which the tars and solids, which are extracted upon contact with the gas, are precipitated by means of distillation in a partial circulation, and from which the heat, which is obtained in the cooling of the gas, is fed into the heat carrier medium through a heat exchanger.

The tars and solids which are separated from the wash tar are preferably again fed into the pressure reactor, at least in part. This makes it possible to crack the precipitated hydrocarbons into gas in the reactor and to avoid heat losses.

In order to make it possible to spray the wash tar in the prewashing stage, it is furthermore provided that tar oil is admixed with the wash tar for the purpose of maintaining the low viscosity which is necessary for the washing process.

The heat which is extracted from the gas during the washing and purification process can be used, in its entirety or partly, for the generation of steam, which is fed into the pressure reactor. This steam is required in any case, and must exceed the reactor pressure by 10 percent for a satisfactory supply into the reactor.

If the entire quantity of extracted heat is not required for this steam generation, it is also possible to feed the heat, in its entirety or partly, into the distillation process for the regeneration and purification of the wash oil, respectively of the wash tar.

Finally, the extracted heat can also be fed into the discharging flow of purified gas. It is known that this flow of purified gas is expanded through a turbine, so that part of the energy is already recovered in this manner. If the reheated purified gas is fed into a firebox, the added heat content of the gas benefits the heat balance of this combustion.

A high boiling point thermal oil, which is fed through a closed thermal circulation, is preferably used as the heat carrier medium. This thermal oil does not contact the gas at any point, so that it can be kept pure and effective for a long period and there is no need to fear clogging in the circulation of the heat carrier medium.

A special advantage is obtained, with respect to an exact adjustability of the heat carrier medium which is to be fed into the heat exchangers, if the heat carrier medium is fed through a partial circulation in the area of the heat exchangers, into which the inflowing, cooled heat carrier medium of the main circulation is added in such measured quantities that the heat carrier medium in the partial circulation will not fall below a predetermined temperature. This possibility of temperature adjustment is especially appropriate in heat exchangers of which the cooling surfaces come into direct contact with the gas. For example, if the temperature on these surfaces, which are cooled by the inflowing heat carrier medium, is too low, tar precipitates on these surfaces, forming thick deposits and incrustations with the dust contained in the gas after only a short time, whereby the cooling apparatus is stopped up. It is possible, with the aid of the above-described measures, to consistently keep the temperature difference so low that there is no danger of these cloggings.

For 95 percent of the wash oil which is used, the boiling temperature is preferably between 250° and 360° C. With this wash oil, an optimum scrubbing of the heavy hydrocarbons from the gas is obtained, with an almost complete avoidance of deposits in the washing apparatus.

A problem in the process in accordance with this invention is still the separation of hydrogen sulfide from the gas. In accordance with the state of the art, this usually takes place by the application of the so-called potash process, in which the gas is washed with an aqueous potash solution. However, this presumes that the gas is cooled to the boiling temperature of water. Because such a severe cooling is not provided for in the process in accordance with this invention and is also not possible without forgoing the desired advantages, it is further proposed, in the development of the process in accordance with this invention, that the gas be brought into contact with hydrogen-sulfide-separating materials, especially alkali or earth alkali, such as dolomite, limestone, quicklime, or soda, or with bog iron ore, for the purpose of separating hydrogen sulfide.

In a first embodiment of this hydrogen sulfide cleaning, the gas is fed through a bed of granulated or pelletized hydrogen-sulfide-separating materials. This processing method has the advantage that the flow of gas need not be loaded with the material which serves for the removal of the hydrogen sulfide. However, the cleaning substance must be exchanged and/or regenerated from time to time.

Alternatively, the hydrogen sulfide separating materials in finely divided form, can be admixed with the gas stream by means of a carrier medium, and subsequently be removed from the gas stream, loaded with the hydrogen sulfide. Theoretically, this procedure can be carried out at any desired point in the process. The selection of the specific point is a function of the selection of the carrier medium. According to a first embodiment of the process, compressed inert gas or rare gas serves as carrier medium for the hydrogen-sulfide-separating materials. In this case, the addition is preferably selected after the washing apparatus. The dry addition of the hydrogen-sulfide-separating materials to the gas has the special advantage that only very insignificant heat losses occur in this case due to the hydrogen sulfide separation.

In contrast, according to a second embodiment, wash oil can be used as carrier medium for the hydrogen-sulfide-separating materials. In this case, the hydrogen-sulfide-separation can be directly combined with the washing process in a particularly advantageous manner.

Both in the washing process and in the separation of the hydrogen sulfide, it is important to provide an intensive contact between the gas and the washing liquid, respectively between the gas and the hydrogen-sulfide-separating materials. This occurs preferably in so-called venturi mixing stages, which have several sequentially-arranged scraper rings, each for the admixture of a partial quantity of the liquids or solids which are to be admixed. In these venturi mixing stages with scraper rings, a very high relative velocity between the flow of gas and the liquids or solids, which are added on the scraper rings, is obtained. The solids are preferably added in powder form, when they have a behavior analogous to liquids.

Centrifugal separators or pressure filters are preferably used for the gas/liquid separation, respectively the gas/solids separation.

In order to keep considerable dust loads away from the described cooling and purification system, a high pressure hot gas cyclone is preferably installed between the coal pressure reactor and the gas purification system, acting, at the same time, as a heat exchanger system. In this cyclone, a large proportion of the dust can be separated before it reaches the washing, cooling, and purification process, which serves more for the fine purification of the gas. Of necessity, this cyclone is also heated considerably and can feed its excess heat again into the reactor, for example. This preferably takes place through an overheating of the steam which is fed into the reactor.

In the following, one embodiment of the invention is described in greater detail, schematically illustrating a gas purification system operating according to the process in accordance with this invention.

In the drawing, the flow of gas is shown with a thick, solid line. The wash oil circulation is illustrated by a thick dash-dotted line, while the thermal circulation is illustrated by a thick dashed line. In addition, the dash lines represent a prewash stage which operates with wash tar and which is used when the coal is very rich in tar. Finally, thin dotted lines represent a dry operating sulfur removal system for the removal of hydrogen sulfide.

The low tar content raw gas comes from a pressure reactor for coal, which is not illustrated in the drawing, and first flows through a heat exchanger 1 which cools the gas from about 550° C. to 300° C. The gas, cooled to 300° C., is fed to a gas washer 2, where the rising flow of gas is sprayed with wash oil, especially with tar oil. The gas now cools to about 260° C. and transfers part of the tars and dust, which are contained in it, to the wash oil. The flow of gas is then again mixed with wash oil in a first venturi stage 3. The flow of gas, which is mixed with the wash oil in the venturi stage, is then purged from the wash oil with the dissolved or deposited tar and dust, in a high pressure separating stage 4. From the high pressure separating stage 4, the gas reaches a second venturi stage 5, where it is again mixed with wash oil. In a centrifugal separator 6, which is attached to the venturi stage 5, the wash oil and the deposited or dissolved materials are separated from the gas. The purified gas then flows through a heat exchanger 7, which serves as afterheater and raises the temperature of the purified gas to about 300° C.

During the entire washing process, the gas is maintained under a pressure of about 20 atmospheres. Following the purification and afterheating, it is fed into a turbine, which is not illustrated, where it is expanded to a pressure at which it can be fed towards its final application.

The wash oil circulation, which is illustrated by thick dash-dotted lines, and which preferably contains tar oil, of which 95 percent is of a boiling temperature range between 250° C. and 360° C., begins at the overflow of a tar pressure-separating vessel 8. From here, two pumps 9 and 10 move the wash oil to the gas washer 2 and the venturi stage 3. In addition, a pump 11 moves the wash oil through the sumps of high pressure separating stage 4 and centrifugal separator 6. The wash oil, which flows back from the gas washer 2, the high pressure separating stage 4, and the centrifugal separator 6, and which is loaded with tar and dust, is fed back into the tar pressure-separating vessel 8.

Both the coal pressure reactor and the distillation separating stage 12 are connected to the tar and solids outlet of the tar pressure separator 8 in such a manner that a part of the tar and solids output is directly fed into the coal pressure reactor and another part into the distillation separating stage 12. If necessary, the total output of the tar pressure separator 8 can also be fed into the distillation separating stage 12, in which the wash oil is distilled off and fed into a collector vessel 14, through a further heat exchanger. By means of a pump 15, the wash oil is fed from the collector vessel 14 into the second venturi stage 5. The wash oil cycle is thus complete. The tar concentrate and dust obtained in the distillation separating stage 12 are also fed into the coal pressure reactor, which is not illustrated. The light oil obtained in the distillation separating stage 12, with a boiling temperature below the boiling temperature of the wash oil fraction, is discharged and fed to a suitable use.

The thermal circulation which is illustrated in thick dash lines and which contains a high boiling point thermal oil, derives most of its heat from heat exchanger 1. In order to avoid a severe cooling of the raw gas in heat exchanger 1 and to avoid gumming up heat exchanger 1, which would be a necessary consequence, the thermal oil circulates in a cycle in the area of heat exchanger 1, with the circulation maintained by means of a pump 16. Behind pump 16, a mixing battery 17 is located in the partial circulation where cool thermal oil, at about 180° C., is admixed to the partial circulation only in such quantities that the thermal oil which enters heat exchanger 1 has a temperature of about 280° to 380° C. The latter temperature is so selected that it precipitates as little tar as possible in the heat exchanger 1. The specific temperature selection is a function of the properties of the coal which is used.

The thermal oil, which leaves heat exchanger 1 with a temperature of about 410° C., is fed to the distillation separating stage 12 and serves to supply the heat which is required for the distillation. The thermal oil, which leaves the distillation separating stage with a temperature of about 370° C., is then fed to heat exchanger 7, where some of the heat contained in the thermal oil is transferred to the purified gas. The thermal oil, which leaves heat exchanger 7 with a temperature of about 320° C., is then fed through a mixing battery 18 to a boiler 19, which serves to generate steam. The steam which is generated in boiler 19 is fed to the coal pressure reactor which is not illustrated in the drawing.

The thermal oil, which leaves boiler 19 with a temperature of about 180° C., is stored in a thermal oil reservoir 20. A pump 21 is located at the outlet of the thermal oil reservoir 20, producing the pressure drop which is necessary for the thermal circulation and feeding the thermal oil to mixing battery 17.

Two partial circulations branch off the described principal circulation of the thermal oil between pump 21 and mixing battery 17; one of these leads to heat exchanger 22, where excess heat is drawn from the washing liquid which is fed into the gas washer 2. The other partial circulation goes to heat exchanger 13, where excess heat is removed from the distilled wash oil. The thermal oil, which is heated up in heat exchangers 22 and 13 is admixed with the thermal circulation in mixing battery 18, i.e. ahead of boiler 19.

In thin dash lines, the drawing further illustrates a dry separation for hydrogen sulfide, which is arranged between centrifugal separator 6 and heat exchanger 7, i.e. in the area of the gas flow which has already been purified. This dry separation has a dry venturi 23, which is interposed in the gas flow, of which the venturi stage has several scraper rings 23a, which are arranged in succession in the direction of flow; dry alkali powder or bog iron ore powder 23b is sprayed into the flow of gas ahead of these. The powder is stored in reservoirs 24 and fed from these reservoirs 24 to the scraper rings of the venturi stage by means of compressed purified gas. The powder acts like a liquid because of its low internal friction. Wetting phenomena or gas/powder reactions, similar to those occurring in a corresponding admixture of a liquid, thus also occur. The stepwise spraying of the powder results in a relatively small pressure drop in the dry venturi 23 and in a very good mixing of the gas flow with the hydrogen-sulfide-absorbing material. Following the dry venturi 23, a dry separator 25 is installed in the gas flow, where the powder, which is enriched with hydrogen sulfide, is again separated from the flow of gas. The dry separation which is described has the special advantage that there are only slight heat losses and extremely insignificant pressure losses.

In another embodiment, which is not illustrated in detail in the drawing, hydrogen sulfide separation takes place by feeding the gas flow, at any point, through a bed with granulated or pelletized hydrogen sulfide separating materials. This preferably takes place in the area of the purified gas, so that this bed is not prematurely gummed up with tar.

Alternatively, the desulfurization can also be carried out by admixing the hydrogen sulfide separating materials in finely-divided form with the wash oil. This can be carried out, for example, in the collector vessel 14. For this purpose, finely-ground bog iron ore, for example, is mixed with the wash oil in vessel 14. The mixture is admixed with the gas flow through the venturi stage 5. In the next-following centrifugal separator 6, both the tar oil which is loaded with washed-out tar and dust and the bog iron ore which is loaded with hydrogen sulfide are separated.

If the raw gas contains very much tar, which would rapidly gum up heat exchanger 1, heat exchanger 1 is replaced by a prewash stage. This prewash stage, which is illustrated in the drawing with thin dash lines, is not operated with wash oil, but with a wash tar, which is used in a circulation from which the tars and solids which are washed out upon contact with the gas are separated through distillation in a partial circulation and from which the heat which is obtained in the cooling of the gas is fed through a heat exchanger to the heat carrier medium. The tar used in the prewash stage is kept sufficiently liquid through the admixture of small quantities of tar oil. Both a pre-purification and a cooling of the gas take place in the prewash, whereby the cooling goes at least so far that the subsequent washing process with wash oil can take place without a considerable temperature drop.

The tar washer, which is employed especially when high-tar-content raw gas is used, is designated as reference 26 in the drawing. The washing circulation of this tar washer 26 has a collector vessel 27, a pump 28, and spray nozzles 29. Two heat exchangers 30 and 31 are interposed in this circulation, transferring the excess heat of this wash tar circulation to the above-described thermal circulation. Part of the flow of the wash tar circulation is constantly branched off and fed into the distillation stage 12. The tar, which is washed out of the raw gas, is discharged through this partial circulation.

If the raw gas contains very large quantities of dust, a high pressure hot gas cyclone can precede the entire gas purification system, where the cyclone, at the same time, configured as a heat exchanger system, in which the raw gas flow is purged of a large proportion of the solids contained in it.

What is claimed is:

1. In a process for purifying gas (generated in pressure gasification of coal, under pressure, at a temperature within the range of from 550° to 1000° C. and containing tar, other heavy hydrocarbons, dust and hydrogen sulfide) which comprises washing the gas with a washing liquid, the improvement wherein the gas is not contacted with water, the washing liquid is a tar oil 95 percent of which has a boiling temperature within the range of from 250° to 360° C., the gas is preliminarily cooled to a temperature within the last-noted range prior to contact with the tar oil and the gas is cooled during the washing only to a temperature which is within the boiling temperature range of the tar oil.

2. A process according to claim 1 which comprises a) continuously separating solids and tar from and thus regenerating used tar oil and b) recycling the solids and tar to the pressure gasification.

3. A process according to claim 2 wherein separating solids and tar from used tar oil is effected by distillation.

4. A process according to claim 1 comprising constantly removing heat from the gas and/or from the tar oil prior to completing washing the gas.

5. A process according to claim 1 which comprises:
 (a) washing the gas with tar oil in several successive washing steps,
 (b) separating washed gas from tar oil after each washing step,
 (c) regenerating tar oil used for washing the gas by continuously separating solids and tar therefrom and recycling the thus-separated solids and tar to the pressure gassification,
 (d) removing heat constantly from the gas before washing it, and
 (e) recycling thus-removed heat back into the process through a heat-carrier medium.

6. A process according to claim 5 which comprises prewashing and cooling the gas with wash tar prior to step (d), separating tar and solids thus removed from said gas by distilling the wash tar employed for prewashing, and transferring to the heat-carrier medium heat imparted to the wash tar when cooling the gas.

7. A process according to claim 6 wherein tar oil is admixed with the wash tar to maintain a low viscosity for washing.

8. A process according to claim 4 which comprises using at least part of the removed heat to generate steam for the pressure gasification.

9. A process according to claim 4 which comprises using at least some of the removed heat for distillation to regenerate and purge tar oil and/or wash tar.

10. A process according to claim 4 which comprises heating purified gas with removed heat.

11. A process according to claim 5 wherein the heat-carrier medium is a high-boiling-point thermal oil maintained in a closed thermal circulation system.

12. A process according to claim 1 which comprises separating hydrogen-sulfide from the gas by bringing the gas into contact with hydrogen-sulfide separating material.

13. A process according to claim 12 wherein the hydrogen-sulfide separating material comprises at least one member selected from the group consisting of dolomite, limestone, quicklime, soda and bog iron ore.

14. A process according to claim 12 which comprises feeding the gas through a bed of granulated or pelletized hydrogen-sulfide-separating material.

15. A process according to claim 12 where the hydrogen-sulfide-separating material, in finely-divided form and in a carrier medium, is admixed with the gas and then separated from the gas after it is loaded with hydrogen-sulfide.

16. A process according to claim 15 wherein the carrier medium for the hydrogen-sulfide-separating material is compressed inert gas or compressed rare gas.

17. A process according to claim 15 wherein the carrier medium for the hydrogen-sulfide-separating material is tar oil.

18. A process according to claim 15 which comprises admixing the gas with washing liquid and/or with hydrogen-sulfide-separating solids in venturi mixing stages.

19. A process according to claim 12 which comprises separating the gas from liquid or solid by centrifugal separation or pressure filtering.

20. A process according to claim 12 which comprises subjecting the gas to a high-pressure hot-gas cyclone with a heat exchanger before contacting said gas with the washing liquid.

21. A process according to claim 12 which comprises bringing the gas into contact with hydrogen-sulfide-separating material after washing the gas with tar oil to separate solids and tar therefrom.

22. A process according to claim 11 wherein the tar-oil washed gas is at a temperature of about 260° C. without further heating.

23. A process according to claim 1 wherein the gas is under a pressure of about 20 atmospheres and which comprises:
(a) cooling the gas to 300° C. with a heat-carrier medium in a heat exchanger;
(b) washing the gas with the tar oil in several successive washing steps, thus further cooling the gas to 260° C. ;
(c) separating wash gas from the tar oil after each washing step;
(d) regenerating tar oil, used for washing the gas, by continuously separating solids and tar therefrom;
(e) continuously removing excess heat from the tar oil with heat-carrier medium in a heat exchanger;
(f) separating hydrogen sulfide from the gas by contacting said gas with hydrogen-sulfide-separating material;
(g) subsequently heating the gas to 300° C. with heat from the heat-carrier medium in a heat exchanger; and
(h) expanding the gas in a gas turbine.

24. A process according to claim 23 which comprises distilling used tar oil to separate solids and tar therefrom.

25. A process according to claim 23 which comprises admixing tar oil with the wash tar to maintain a low viscosity for washing.

26. A process according to claim 23 which comprises recycling into the process heat remaining in the heat-carrier medium.

27. A process according to claim 26 which comprises generating steam for the pressure gasification with at least part of the recycling heat.

28. A process according to claim 27 which comprises regenerated and purging tar oil and/or wash tar by distillation with at least some of the recycling heat.

29. A process according to claim 23 wherein the heat-carrier medium is a high-boiling-point thermal oil maintained in a closed thermal circulation system.

30. A process according to claim 23 wherein the hydrogen-sulfide separating material comprises at least one member selected from the group consisting of dolomite, limestone, quicklime, soda and bog iron ore ($Fe_2O_3$).

31. A process according to claim 23 which comprises feeding the gas through a bed of granulated or pelletized hydrogen-sulfide-separating material.

32. A process according to claim 23 which comprises admixing the hydrogen-sulfide-separating material, in finely-divided form, with the gas and then separating said material from the gas after the material is loaded with hydrogen sulfide.

33. A process according to claim 32 wherein the hydrogen-sulfide-separating material is employed in a carrier medium comprising compressed inert gas or compressed rare gas.

34. A process according to claim 23 wherein the hydrogen-sulfide-separating material is employed in a carrier medium comprising wash oil.

35. A process according to claim 23 which comprises admixing the gas with washing liquid and/or with hydrogen-sulfide-separating solids in a venturi mixing stage.

36. A process according to claim 23 which comprises separating the gas from liquid or solid by centrifugal separation or by pressure filtration.

37. A process according to claim 23 which comprises subjecting the gas to a high-pressure hot-gas cyclone with a heat exchanger before contacting said gas with the washing liquid.

38. A process according to claim 1 which comprises:
(a) cooling the gas to 300° C. in a prewashing step with circulating wash tar;
(b) washing thus-cooled gas with the tar oil in several successive washing steps, thus further cooling it to 260° C.;
(c) separating washed gas from the tar oil after each washing step;
(d) regenerating tar oil, used for washing the gas, by continuously separating solids and tar therefrom;
(e) continuously removing excess heat from the tar oil with heat-carrier medium in a heat exchanger;
(f) separating hydrogen sulfide from the gas by contacting said gas with hydrogen-sulfide-separating material;
(g) subsequently heating the gas to 300° C. in a heat exchanger with heat from the heat-carrier medium; and
(h) expanding the gas in a gas turbine.

39. A process according to claim 38 which comprises separating tar and solids removed from the gas in the prewashing step by the circulating wash tar in a partial recycle by distilling the circulating wash tar, and using heat imparted to the wash tar by the gas in a heat exchanger to heat the heat-carrier medium.

40. A process according to claim 39 which comprises recycling separated solids and tar from steps (a) and (d) to the pressure gasification.

* * * * *